(12) United States Patent
Kalyuzhny

(10) Patent No.: US 11,699,294 B2
(45) Date of Patent: *Jul. 11, 2023

(54) OPTICAL CHARACTER RECOGNITION OF DOCUMENTS HAVING NON-COPLANAR REGIONS

(71) Applicant: ABBYY Development Inc., Dover, DE (US)

(72) Inventor: Aleksey Kalyuzhny, Moscow Oblast (RU)

(73) Assignee: ABBYY Development Inc., Raleigh, NC (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/446,348

(22) Filed: Aug. 30, 2021

(65) Prior Publication Data

US 2021/0390328 A1 Dec. 16, 2021

Related U.S. Application Data

(63) Continuation of application No. 16/548,701, filed on Aug. 22, 2019, now Pat. No. 11,106,931.

(30) Foreign Application Priority Data

Jul. 22, 2019 (RU) ................................. 2019123072

(51) Int. Cl.
*G06V 30/148* (2022.01)
*G01B 21/16* (2006.01)
(Continued)

(52) U.S. Cl.
CPC ........... *G06V 30/153* (2022.01); *G01B 21/16* (2013.01); *G06V 30/1452* (2022.01);
(Continued)

(58) Field of Classification Search
CPC ............ G06V 30/153; G06V 30/1452; G06V 30/1983; G06V 30/224; G06V 30/40; G06V 30/10; G01B 21/16; G06F 18/00
(Continued)

(56) References Cited

U.S. PATENT DOCUMENTS 5,594,809 A 1/1997 Kopec et al.
5,689,620 A * 11/1997 Kopec .................. G06F 18/214
382/187

(Continued)

FOREIGN PATENT DOCUMENTS

DE 102011119941 A1 * 6/2013 ........... G06K 9/4676
EP 2669847 A2 * 12/2013 ............... G06K 9/18
(Continued)

*Primary Examiner* — Mahendra R Patel
(74) *Attorney, Agent, or Firm* — Lowenstein Sandler LLP

(57) ABSTRACT

Systems and methods for performing OCR of an image depicting text symbols and imaging a document having a plurality of planar regions are disclosed. An example method comprises: receiving a first image of a document having a plurality of planar regions and one or more second images of the document; identifying a plurality of coordinate transformations corresponding to each of the planar regions of the first image of the document; identifying, using the plurality of coordinate transformations, a cluster of symbol sequences of the text in the first image and in the one or more second images; and producing a resulting OCR text comprising a median symbol sequence for the cluster of symbol sequences.

20 Claims, 8 Drawing Sheets

(51) Int. Cl.
*G06V 30/224* (2022.01)
*G06V 30/40* (2022.01)
*G06V 30/14* (2022.01)
*G06V 30/196* (2022.01)
*G06V 30/10* (2022.01)

(52) U.S. Cl.
CPC ........ *G06V 30/1983* (2022.01); *G06V 30/224* (2022.01); *G06V 30/40* (2022.01); *G06V 30/10* (2022.01)

(58) Field of Classification Search
USPC ........................................................ 382/177
See application file for complete search history.

(56) References Cited

U.S. PATENT DOCUMENTS

| | | | |
|---|---|---|---|
| 5,960,448 A * | 9/1999 | Reichek | G06F 3/0481 715/236 |
| 6,837,432 B2 * | 1/2005 | Tsikos | G02B 27/48 235/472.01 |
| 7,077,319 B2 * | 7/2006 | Schnee | G06K 7/10752 235/472.01 |
| 7,620,268 B2 * | 11/2009 | Myers | G06V 30/1478 382/290 |
| 7,743,990 B2 | 6/2010 | Schnee et al. | |
| 7,792,363 B2 * | 9/2010 | Foss | G10L 13/00 382/187 |
| 7,840,033 B2 * | 11/2010 | Kurzweil | G06F 40/253 382/114 |
| 8,717,632 B2 | 5/2014 | Zheng et al. | |
| 8,995,774 B1 | 3/2015 | van Deventer et al. | |
| 9,058,536 B1 * | 6/2015 | Yuan | G06V 30/262 |
| 9,070,035 B2 | 6/2015 | Pan et al. | |
| 9,256,922 B2 * | 2/2016 | Zagaynov | G06T 3/4053 |
| 9,792,674 B2 | 10/2017 | Russell | |
| 10,489,373 B1 | 11/2019 | Alda | |
| 10,621,470 B2 | 4/2020 | Ackley | |
| 10,735,792 B2 | 8/2020 | Sandland | |
| 10,803,350 B2 * | 10/2020 | Ma | G06T 7/11 |
| 2005/0180632 A1 * | 8/2005 | Aradhye | G06V 20/63 382/182 |
| 2007/0033154 A1 | 2/2007 | Trainum et al. | |
| 2008/0063276 A1 * | 3/2008 | Vincent | G06V 10/762 382/182 |
| 2009/0077617 A1 | 3/2009 | Levow et al. | |
| 2013/0106685 A1 | 5/2013 | Davis et al. | |
| 2017/0154204 A1 | 6/2017 | Ryu et al. | |
| 2019/0188511 A1 * | 6/2019 | Kalyuzhny | G06V 30/262 |
| 2019/0197334 A1 * | 6/2019 | Kalyuzhny | G06F 18/23 |

FOREIGN PATENT DOCUMENTS

| | | | | |
|---|---|---|---|---|
| EP | 3382605 A1 * | 10/2018 | ........ | G06K 9/00463 |
| JP | 2000182064 A * | 6/2000 | ......... | G06F 16/5854 |
| RU | 2445699 C1 | 3/2012 | | |
| RU | 2597163 C2 * | 9/2016 | ......... | G06K 9/00483 |
| RU | 2605078 C2 * | 12/2016 | .......... | G06F 3/0482 |
| RU | 2613849 C1 | 3/2017 | | |
| RU | 2634194 C1 | 10/2017 | | |
| RU | 2648638 C2 * | 3/2018 | ............ | G06F 40/10 |
| RU | 2657181 C1 | 6/2018 | | |
| RU | 2699687 C1 * | 9/2019 | ........ | G06F 17/2735 |
| WO | WO-2015073920 A1 * | 5/2015 | ........ | G06K 9/00456 |

* cited by examiner

OPTICAL CHARACTER RECOGNITION OF DOCUMENTS HAVING NON-COPLANAR REGIONS

RELATED APPLICATIONS

This application is continuation of U.S. patent application Ser. No. 16/548,701, filed Aug. 22, 2019, now U.S. Pat. No. 11,106,931, issued Aug. 31, 2021, and claims the benefit of priority under 35 USC 119 to Russian patent application No. 2019123072, filed Jul. 22, 2019, the entire contents of which are hereby incorporated by reference herein.

TECHNICAL FIELD

The present disclosure is generally related to computer systems, and is more specifically related to systems and methods for optical character recognition (OCR).

BACKGROUND

Optical character recognition (OCR) is a computer-implemented conversion of text images (including typed, handwritten, or printed text) into computer-encoded electronic documents.

SUMMARY OF THE DISCLOSURE

In accordance with one or more aspects of the present disclosure, an example method for performing optical character recognition (OCR) of an image depicting symbols may comprise: receiving, by a processing device, a first image of a document having a plurality of planar regions, wherein at least two planar regions of the plurality of planar regions are mutually non-coplanar; performing optical character recognition (OCR) of the first image to determine an OCR text in the first image; obtaining a text in one or more second images of the document; identifying a plurality of base points in the first image; identifying a plurality of base points in each second image, wherein each point of the plurality of base points in a respective second image corresponds to one base point of the plurality of base points in the first image; determining parameters of a first coordinate transformation converting coordinates of a first set of base points of the plurality of base points in the first image into coordinates of corresponding base points of the plurality of base points in the respective second image, wherein each of base points of the first set of base points is within a first part of the first image, wherein the first part of the first image images a first planar region of the plurality of planar regions of the document; determining parameters of a second coordinate transformation converting coordinates of a second set of base points of the plurality of base points in the first image into coordinates of corresponding base points in the respective second image, wherein each base point of the second set of base points is within a second part of the first image, wherein the second part of the first image images a second planar region of the plurality of planar regions of the document, and wherein the second planar region of the document is non-coplanar with the first planar region of the document; identifying, using the parameters of the first coordinate transformation and the parameters of the second coordinate transformation, a cluster of symbol sequences comprising a symbol sequence of the OCR text in the first image and at least one corresponding symbol sequence in the one or more second images; and producing a resulting OCR text comprising a median symbol sequence for the cluster of symbol sequences.

In accordance with one or more aspects of the present disclosure, an example system for performing optical character recognition (OCR) of a series of images depicting symbols of a certain alphabet may comprise a memory that stores instructions and a processing device to execute the instructions from the memory to: receive a first image of a document having a plurality of planar regions, wherein at least two planar regions of the plurality of planar regions are mutually non-coplanar; perform optical character recognition (OCR) of the first image to determine an OCR text in the first image; obtain a text in one or more second images of the document; identify a plurality of base points in the first image; identify a plurality of base points in each second image, wherein each point of the plurality of base points in a respective second image corresponds to one base point of the plurality of base points in the first image; determine parameters of a first coordinate transformation converting coordinates of a first set of base points of the plurality of base points in the first image into coordinates of corresponding base points of the plurality of base points in the respective second image, wherein each of base points of the first set of base points is within a first part of the first image, wherein the first part of the first image images a first planar region of the plurality of planar regions of the document; determine parameters of a second coordinate transformation converting coordinates of a second set of base points of the plurality of base points in the first image into coordinates of corresponding base points in the respective second image, wherein each base point of the second set of base points is within a second part of the first image, wherein the second part of the first image images a second planar region of the plurality of planar regions of the document, and wherein the second planar region of the document is non-coplanar with the first planar region of the document; identify, using the parameters of the first coordinate transformation and the parameters of the second coordinate transformation, a cluster of symbol sequences comprising a symbol sequence of the OCR text in the first image and at least one corresponding symbol sequence in the one or more second images; and produce a resulting OCR text comprising a median symbol sequence for the cluster of symbol sequences.

In accordance with one or more aspects of the present disclosure, an example computer-readable non-transitory storage medium may comprise executable instructions that, when executed by a processing device, cause the processing device to: receive a first image of a document having a plurality of planar regions, wherein at least two planar regions of the plurality of planar regions are mutually non-coplanar; perform optical character recognition (OCR) of the first image to determine an OCR text in the first image; obtain a text in one or more second images of the document; identify a plurality of base points in the first image; identify a plurality of base points in each second image, wherein each point of the plurality of base points in a respective second image corresponds to one base point of the plurality of base points in the first image; determine parameters of a first coordinate transformation converting coordinates of a first set of base points of the plurality of base points in the first image into coordinates of corresponding base points of the plurality of base points in the respective second image, wherein each of base points of the first set of base points is within a first part of the first image, wherein the first part of the first image images a first planar region of the plurality of planar regions of the document; determine parameters of a second coordinate transformation converting coordinates of a second set of base points of the plurality of base points in the first image into coordinates of corresponding base points in the respective second image, wherein each base point of the second set of base points is within a second part of the first image, wherein the second part of the first image images a second planar region of the plurality of planar regions of the document, and wherein the second planar region of the document is non-coplanar with the first planar region of the document; identify, using the parameters of the first coordinate transformation and the parameters of the second coordinate transformation, a cluster of symbol sequences comprising a symbol sequence of the OCR text in the first image and at least one corresponding symbol sequence in the one or more second images; and produce a resulting OCR text comprising a median symbol sequence for the cluster of symbol sequences.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
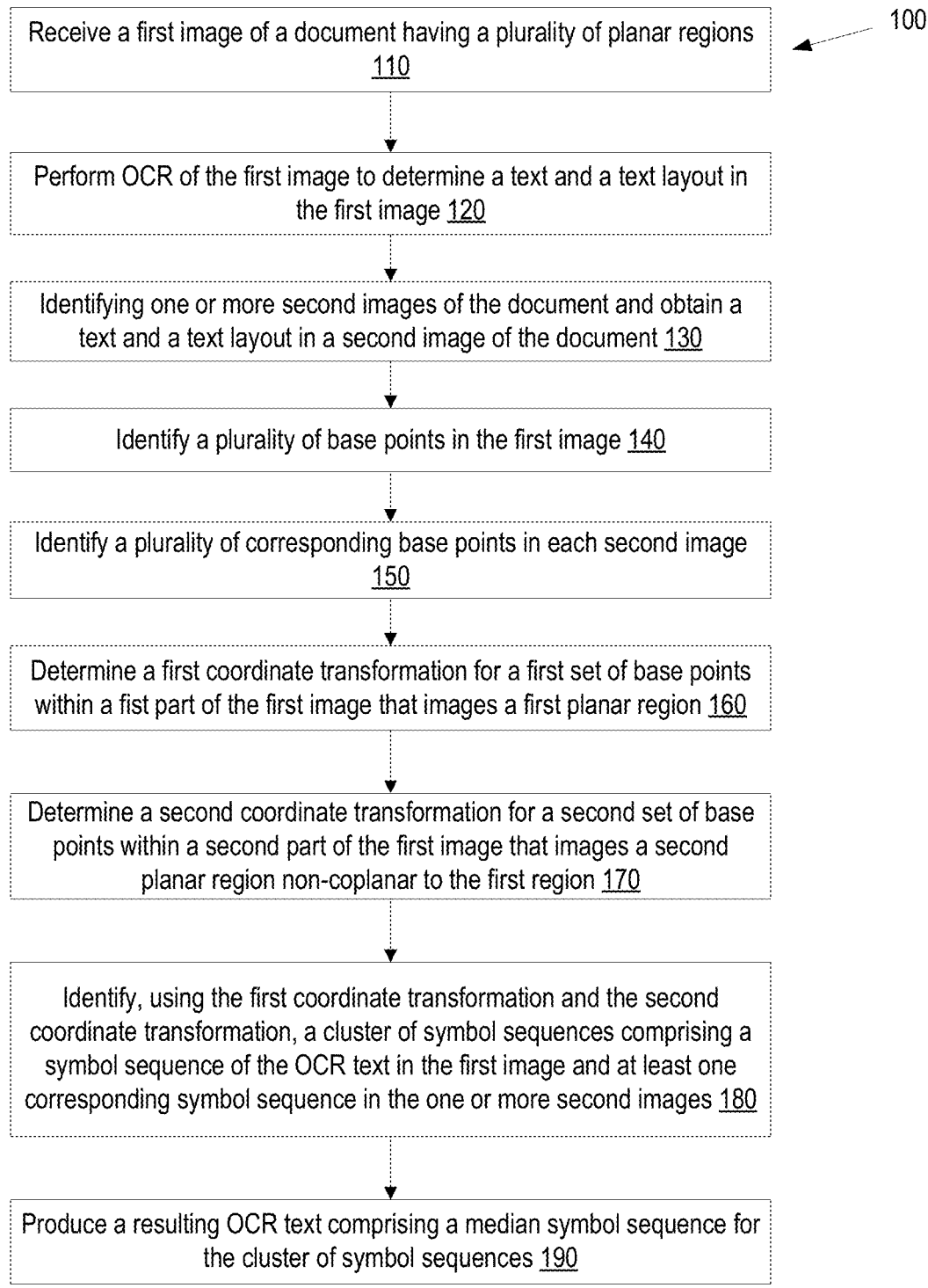
FIG. 1 depicts a flow diagram of one illustrative example of a method for performing optical character recognition (OCR) of a series of images including at least one image of a bent document, in accordance with one or more aspects of the present disclosure.

Described herein are methods and systems for performing optical character recognition (OCR) of one or more images depicting symbols of a certain alphabet. Some of the images may include symbols located within different planes, for example, images of a document that has been bent, or a document that has not been fully opened, a street image having a plurality of non-coplanar signs, billboards, showcase windows, license plates of motor vehicles that are moving in different directions, and the like. The alphabets whose symbols may be processed by the systems and methods described herein include true alphabets that have separate symbols, or glyphs, representing individual sounds, as well as hieroglyphic alphabets that have separate symbols representing larger units such as syllables or words.

In the following description, the term "document" shall be interpreted broadly as referring to a wide variety of text carrying media, including but not limited to printed or handwritten paper documents, banners, posters, signs, billboards, and/or other physical objects carrying visible text symbols on one or more of their surfaces. "Document image" herein shall refer to an image of at least a part of the original document (e.g., a page of a paper document).

An OCR system may acquire a document image and transform the acquired image into a computer-readable and searchable format comprising the textual information extracted from the image of the document. The OCR process may be hindered by various image defects, such as visual noise, poor focus or image clarity, glares, etc., which may be routinely caused by the camera shake, inadequate illumination, incorrectly chosen shutter speed or aperture, and/or other conditions and attenuating circumstances. While common OCR methods may not always correctly perform character recognition in the presence of the above-noted and other image defects, the systems and methods described herein may significantly improve the OCR quality by creating a set of images by applying different sets of conversion operations to the image of the document, as described in more details herein below.

Furthermore, OCR of different images in a series of images may not produce exactly the same symbol sequences. For example, the word "pack" in a paper document, such as a book page, may be correctly recognized by OCR of one image, but be incorrectly recognized as "puck" by OCR of another image due to an insufficient quality of that image. In some instances, the word "pack" may be located near the middle area of a book where pages are bent due to the stitching through the book fold. As a result, the beginning of the word may be located in a plane that is significantly different from the plane of the word's ending, and the letter "p" imaged from an acute angle may be recognized as not having a rounded portion (e.g., as "l") with the whole word misrecognized as "lack."

The availability of multiple images of the document may significantly improve reliability of OCR of the text contained in the document. For example, following OCR of a first image of the document, a processing device (e.g. a processing device of the OCR system) may identify a symbol sequence (a word, a plurality of words, a sentence, a paragraph, and so on) in the OCR text of the first image (e.g., "pack"). The processing device may also identify a corresponding symbol sequence in the second image (e.g., "puck"). In some implementations, the processing device may also identify a corresponding symbol sequence in the third image (e.g., "lack"). The available series of symbol sequences (e.g., "pack," "puck," and "lack") constitute a cluster of symbol sequences corresponding to a particular segment of the text of the document. Following the identification of the cluster of symbol sequences, the processing device may apply a pre-defined metric to the cluster to determine a median symbol sequence. The metric may be designed in a variety of ways that make the median symbol sequence a likely true representation of the particular segment of the text of the document. In one implementation, the metric may calculate the number of appearances of different symbols in particular positions of the symbol sequences. For example, symbol "p" may appear twice in the first position whereas symbol "l" may appear only once. Hence, the processing device may determine "p" to be the first symbol in the median symbol sequence. Likewise, symbol "u" may appear once in the second position whereas symbol "a" may appear twice therein. Hence, the processing device may determine "a" to be the second symbol in the median symbol sequence. The fourth and third symbols may be "c" and "k" in all three sequences and thus may be included in the median symbol sequence in their corresponding positions. As a result, the processing device may identify the median symbol sequence as "pack" and include it in the OCR text of the document as the likely (e.g., most likely) true sequence contained in the particular segment of the document. The above example is intended for illustration purposes only. The actual determination of the median symbol sequence may be based on a different algorithm. Further illustrative examples of such possible algorithms are discussed more fully below.

The quality of OCR may depend on how accurately various symbol sequences in different images are matched to each other. For example, the symbol sequence "pack" may be located in the middle of the first image while the sequence "puck" may be located near the left edge of the second image. Yet they may represent OCR results of the same segment of the document. To ensure that symbol sequences in different images are correctly matched to each other, the processing device may determine parameters of coordinate transformations converting coordinates in one image to coordinates in another image. For N images, there may be N−1 coordinate transformations to establish correspondence between points belonging to all the images. In one implementation, the N−1 coordinate transformations may separately convert the coordinates of image 1 to the coordinates of image 2, the coordinates of image 1 to image 3, . . . the coordinates of image 1 to image N. In another representation, the N−1 coordinate transformations may sequentially convert the coordinates of image 1 to the coordinates of image 2, the coordinates of image 2 to image 3, . . . the coordinates of image N−1 to image N. In other implementations, there may be any other set of at least N−1 coordinate transformations so that the coordinates of any image j are converted to the coordinates of any other image k directly or via one or more intermediate transformation (but no more than N−1 total transformations).

The coordinate transformations may be projective transformations, in some implementations. "Projective transformation" herein refers to a transformation that maps lines to lines, but does not necessarily preserve parallelism. One example of a projective transformation is a transformation converting coordinates associated with an image of a blackboard (e.g., with a text written on it) into coordinates associated with the blackboard itself. Similarly, another projective transformation may convert the coordinates associated with a first image of the blackboard into coordinates associated with a second image of the same blackboard, but taken from a different camera location, using a different lens zoom (magnification), angle, etc. Likewise, two planar images of the same three-dimensional landscape/scene may be converted into each other by an appropriately chosen projective transformation.

The parameters of the coordinate transformations converting coordinates of one image into coordinates of another image may be determined from known (e.g., identified) base points in both images. For example, four base points may be needed to fully determine the parameters of a projective transformation. In one implementation, the four points may be related to the layout of the text, such as the outside contour of the text on the page (e.g., the four corners of the text) or the corners of some bounding box within the page. In other implementations, the corners of a picture may serve as the base points for determination of the parameters of the coordinate transformations. In some implementations, less than four base points may be associated with a specific object (e.g., a graphics element) while the remaining base points may be associated with another object (e.g., two base points may be the two ends of a horizontal line in a letterhead graphics). In yet other implementations, as discussed below, some or all the base points may be associated with one or more textual artifacts, such as a rare symbol (or a sequence of symbols), as explained in more detail below.

In many instances, however, a single coordinate transformation may not adequately map the entire region of the document. A single transformation relating the coordinates may suffice if each of the images is taken when the text and other components (e.g., graphics, mathematical equations, music scores, and so on) of the document are located within a single plane. This may not always be possible. The document—such as a passport or a book—may have a fold preventing the document from being opened fully, so that the two exposed pages of the document may be at a substantial angle to each other, such as 10 degrees, 20 degrees, 30 degrees, or more. The document may be stored in a folded (or rolled) state and/or may have an unintentional fold from careless handling. The document may have a tear, and the torn part—connected or unconnected to the rest of the document—may be positioned within a plane that may not align with the rest of the document, at the time the image is taken. In automated mail and parcel processing, labels may wrap around end over two adjacent surfaces or may be bent from handling or transportation.

In such instances, a coordinate transformation determined from a plurality of (e.g., four) base points, identified without regard to the non-coplanar nature of the imaged document, may fail to ensure satisfactory OCR quality. For example, all randomly selected base points may happen to be within a first planar region of the document (e.g., page 1 of a passport). In this case, the obtained coordinate transformation may adequately convert the coordinates of the first planar region to the coordinates of a second image of the document (which may be an image of a fully opened passport). However, such transformation will work for a second planar region of the document (e.g., page 2 of the passport). The processing device that may then apply the obtained coordinate transformation to the entire first image of the document, under a wrong assumption that the document is flat. This may detrimentally affect the accuracy of the OCR of the text of the document. For example, the processing device may fail to identify the symbol sequences located in the second planar region of the document and, as a consequence, may fail to include these symbol sequences in the cluster of symbol sequences. Worse still, the processing device may identify and include wrong symbol sequences in the cluster of symbol sequences, which may significantly degrade the overall quality of the ORC.

Aspects of the present disclosure describe methods and systems that address these and other shortcomings by separating an image of a bent document into a plurality of parts where each part images a planar region of the bent document. Each part may be assigned a separate, associated with this part of the image (region of the document) coordinate transformation. The parameters of the plurality of corresponding coordinate transformations may be determined by identifying base points located within each planar region of the document. The parameters of the transformation may be used to identify one or more boundary lines between the planar regions of the document. The boundary lines may be used to identify an appropriate coordinate transformation that is to be used for a given point (x,y) of the image, depending on the planar region of the document to which the point (x,y) in the image corresponds. To further improve the accuracy of the coordinate transformations, the processing device may determine boundary corrections that may optionally be used in a region where different planar regions intersect. For example, the document in the first image may not have a perfectly sharp fold between two flat regions. Instead, the folded area may extend over some distance and transition smoothly into the planar regions on both sides of the boundary. In such situations, the boundary line may serve as a reference line for the location of the folder area. To account for a non-zero spatial extent of the folded area, the coordinate transformations for the regions adjacent to the boundary line may be improved with heuristic boundary corrections that may decrease with the distance from the boundary line.

Upon performing some or all of the procedures described above, the processing device may determine the topology of the first image. Such topology may include one or more boundary lines indicating the locations of the planar regions of the document, a plurality of the coordinate transformations corresponding to some or all of the planar regions, and one or more boundary corrections for the folded areas near the corresponding boundary lines. The determined topology of the image may be used to identify symbol sequences in the first image and the corresponding to them matching symbol sequences in other images of the same document. The identified matching symbol sequences may be combined into clusters of symbol sequences for further OCR processing.

Various aspects of the above referenced methods and systems are described in details herein below by way of examples, rather than by way of limitation.

FIG. 1 depicts a flow diagram of one illustrative example of a method 100 for performing OCR of a series of images including at least one image of a bent document, in accordance with one or more aspects of the present disclosure. Method 100 and/or each of its individual functions, routines, subroutines, or operations may be performed by one or more processors of the processing device (e.g., example computing system 800 of FIG. 8) executing the method. In certain implementations, method 100 may be performed by a single processing thread. Alternatively, method 100 may be performed by two or more processing threads, each thread executing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

In some implementations, processing of each image of an original document may be initiated after the image is received by the processing device implementing the method. Such processing may be substantially completed before the next image is received. In various alternative implementations, processing of consecutive images may overlap in time (e.g., may be performed by different threads or processes that are running on one or more processors). Alternatively, two or more images may be buffered and processed asynchronously with respect to receiving the other images of a plurality of images received by the computer system implementing the method.

At block 110, the processing device (e.g., a computer) implementing method 100 may receive a first image of a document. The first image may be a part of a series of images of the same document. The term "first" merely identifies some image of such series and should not be understood as necessarily the first image that is taken chronologically in relation to other images of the series. In some instances, the first image may indeed be the earliest image of the document, but in other instances, the first image may be any image in the series, including the very last image. In some instances, the first image may be taken concurrently with one or more other images of the series. Any number of images (including the first image) of the series may be taken by the same camera or different cameras, by the same camera at the same or different shooting angles. The images may differ by the image scale, shooting angle, shutter speed, aperture, image brightness, glaring, presence of external objects that at least partially cover the original text, and/or other image features, visual artifacts, and imaging process parameters.

The term "camera" may include any device capable of detecting light emitted or reflected by an object and converting intensity of the detected light into an image of the object. "Camera" may include any analog photographic or video camera, any digital photographic or video camera, any copy machine, any scanning device, and the like. In some implementations, any number of the images in the series may be a part of the same videostream. In some implementations, any number of the images in the series may be taken by a moving camera, such as a camera mounted on a moving vehicle, a hand-held camera, a body camera, and the like.

The first image may be taken of the document when the document has a number N>1 planar regions where at least two planar regions are mutually non-coplanar. For example, the document may be a book having a V-shaped form (e.g., a book supported by a cradle of a scanner) with the left page representing a first planar region of the document and the right page representing a second planar region of the document. In some implementations, one page (or both pages) may have a crease so that a part of the page is bent relative to the rest of the page, so that the document has at least three planar regions of which at least two are mutually non-coplanar.

At block 120, the processing device may perform optical character recognition of the first image, thus producing the recognized text and layout information. The layout information may associate the recognized symbols and/or groups of symbols with their respective positions in the image.

At block 130, the processing device may identify one or more second images of the document and obtain a text and a corresponding text layout in each second image of the document. In some implementations, there may be a single second image. In other implementations, there may be more than one second image, e.g., a series of second images. For clarity and conciseness, the description below refers to a single second image but substantially the same processing may be applied to implementations with multiple second images. Accordingly, the term "second image" herein shall be understood as referring to "one or more second images."

The second image may be a part of the same series of images to which the first image belongs and may be processed in the same or a similar manner as the first image. For example, the same processing device may perform OCR of the second image using the same methods of OCR processing. In other implementations, however, the second image may have been processed by a different processing device at a different (e.g., previous) time. Accordingly, the processing device performing method 100 may obtain the text/layout of the second image by retrieving the text/layout from a memory storage, which may be a local storage, a remote storage, a network storage (e.g., cloud storage), or any other storage device.

At block 140, the processing device may identify a plurality of base points in the first image. A base point may be any point in the first image associated with a distinct feature in the document that may be used to establish a correspondence between locations in the first image and the locations in the second image, provided that the matching feature may be identified in the second image. Some features that can possibly be used as base points—corners or the text, graphics, bounding boxes, ends of lines, etc.—have been discussed above. Additionally, a base point in the first image may be associated with one or more textual artifacts in the OCR results for the first image, e.g., an artifact that is not replicated in the rest of the OCR text of the first image. A textual artifact may be represented by a sequence of symbols (e.g., words) having a low frequency of occurrence within the OCR-produced text. For example, an artifact may occur with the frequency that does not exceed a specified threshold frequency, which may be set to 1 to reference a unique sequence of symbols that occurs only once. In an illustrative example, a low frequency word may be identified by sorting the OCR-produced words in the order of their respective frequencies and selecting a word having the lowest frequency. In certain implementations, only sequences of symbols, the respective lengths of which exceed a certain threshold length may be utilized by the method, since shorter sequences of symbols may produce less reliable base points. In some implementations, a number M of sequences of symbols may be identified, such as M least frequent sequences. In such implementations, the threshold frequency is defined as the highest frequency of occurrence among the M least frequent sequences.

The processing device may employ the layout information associated with the identified textual artifacts to identify at least one base point representing each textual artifact within the first image. In an illustrative example, a base point associated with the identified sequence of symbols may be represented by the center of the minimum bounding rectangle of the sequence of symbols. In another illustrative example, two or more base points associated with the identified sequence of symbols may be represented by the corners of the minimum bounding rectangle of the sequence of symbols.

The processing device may identify a pre-defined number of base points in the first image, in some implementations. For example, the processing device may identify at least four base points, at least eight base points, at least ten base points, and so on. In some implementations, the processing device may identify as many base points as possible in view of a predetermined accuracy metric. For example, a new base point may be retained and added to the list of base points, if the new base point is separated from all other base points by at least a distance equal to one character size (the character width or length), or one half of the character size, etc. The character size may be a representative size of a character (e.g., a median size) in the first image of the document. Conversely, a new base point may be discarded and not added to the list of identified base points if the new base point is too close to the base points that are already on the list of identified base points. The list of identified base points may be stored in the memory of the processing device (or any other memory accessible to the processing device). The list of identified base points may include the coordinates (x,y) of each of the identified base points. The list may also store a description of the nature of the base point, such as a description of the textual artifact with which the base point is associated. For example, the list may include a base point A that is associated with the textual artifact represented by the word "unabashedly" (that may appear in the first image only once) and the relationship (e.g., the bottom right corner of the bounding box corresponding to the word) of the base point to this textual artifact.

At block 150, the processing device may identify, in the second image, the base points that correspond to the base points in the first image identified at block 140. The blocks 140 and 150 may be executed consequently or concurrently. For example, all base points in the first image may be identified first, before the corresponding (matching) base points in the second image are identified. In some instances, it may not be possible to identify some of the corresponding base points in the second image. For example, some of the base points in the first image may correspond to a region in the second image that has a poor resolution, was hidden by another object, or located in a part of the document absent in the second image. Accordingly, such base points previously identified in the first image may now be discarded. In some implementations, the method 100 may then revert to block 140 to identify more base points, if the number of remaining base points falls below a certain threshold. In some implementations, the order of operations in blocks 140 and 150 is reversed, so that the base points are first identified in the second image and then the corresponding base points are identified in the first image. In some implementations, the operations in blocks 140 and 150 are interlaced, so that when one base point is identified in the first (second) image, the corresponding base point is identified in the second (first) image before the next base point is identified.

After (or during) identification of the matching base points in the two images, the processing device may inspect the identified base points and discard at least some of them in view of pre-defined filtering criteria. In an illustrative example, the computer system may verify that arbitrarily selected groups of the matching base points exhibit certain geometric features that are invariant with respect to the chosen images. For example, a (topologically) invariant geometric feature may be represented by the direction of the path traversing at least three matching base points. More specifically, the direction of the triangular paths traversing three base points 1, 2, and 3 may be the same, i.e., the clockwise direction, in both images, and hence the base points 1, 2, and 3 are likely to represent the matching sequences of symbols in the two images, and therefore may be relied upon for performing subsequent operations of the method 100. Conversely, the direction of the triangular paths traversing the base points 1, 2, and 3 may be clockwise in the first image but counterclockwise in the second image, and hence at least some of the base points 1, 2, and 3 are likely to represent different (non-matching) sequences of symbols in the two images. As a result, one or more of the base points 1, 2, and 3 may be discarded.

Additional or alternative invariant topological features used for filtering of the identified base points may include the direction of the path traversing the vectors connecting an arbitrarily chosen point (e.g., the origin of the coordinate plane associated with the image) and each of the base points (in the order of their numerical designators), or the topology of geometric shapes produced by the lines connecting an arbitrarily chosen set of base points. If the number of remaining base points, after filtering, falls below a pre-determined value, the method 100 may repeat blocks 140 and 150 (and, optionally, the filtering steps) until the pre-determined number of the identified base points is achieved.

Figure 2:
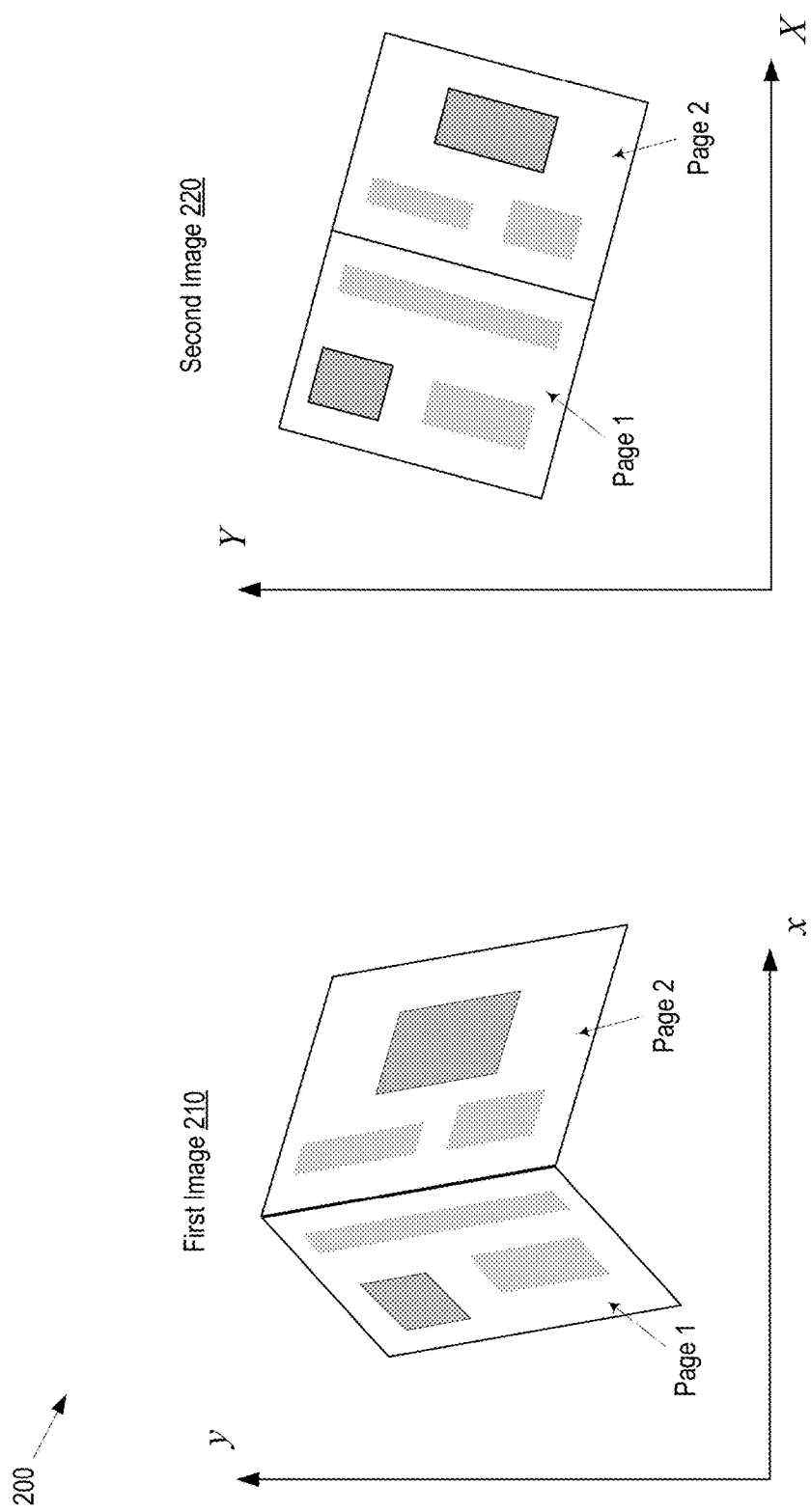
FIG. 2 schematically illustrates an example of a first image of a document (e.g., a passport) that is not fully opened (left panel) and a second image of the same document that is fully opened, e.g. (right panel).

At blocks 160 and 170, the processing device may determine that the first image is that of a document having a plurality of (e.g., N) planar regions. The processing device may also determine parameters of a plurality of (N) coordinate transformations that are to be used to convert coordinates (x,y) of various points of the first image into the coordinates of the second image. For example, if a point (x,y) is within a first (second) part of the first image, wherein the first part images a first (second) planar region of the document, the processing device may use a first (second) coordinate transformation to convert the coordinates (x,y) in the first image into the coordinates (X,Y) in the second image. FIG. 2 schematically illustrates an example 200 of a first image 210 of a document (e.g., passport) that is not fully opened (left panel) and a second image 220 of the same document that is fully opened (right panel). Although shown in FIG. 2 are Cartesian coordinates, any other coordinates may be used, as convenient, such as polar coordinates, affine coordinates, elliptic coordinates, and so on. Below, blocks 160 and 170 are first described for an exemplary implementation where the second image is that of a document having one planar region (e.g., fully opened document). Generalizations required to implement OCR in situations where both the first and the second images are those of a bent document (i.e. both images imaging multiple non-coplanar regions) will be discussed subsequently.

Referring again to FIG. 1, at block 160, the processing device may construct a first coordinate transformation that translates coordinates (x,y) of a first part of the first image 210, e.g., the image of page 1 of the document, into coordinates (X,Y) of the corresponding part (namely the image of the same page 1) of the second image 220. The first coordinate transformation may be a projective transformation that can be expressed by the following equations:

$$X = \frac{Ax_1 * x + Ax_2 * y + Ax_3}{Ax_4 * x + Ay_4 * y + 1} \quad (1)$$

$$Y = \frac{Ay_1 * x + Ay_2 * y + Ay_3}{Ax_4 * x + Ay_4 * y + 1} \quad (2)$$

wherein the transformation coefficients $\{Ax_j, Ay_k\}$ (namely, $Ax_1$, $Ax_2$, $Ax_3$, $Ax_4$, $Ay_1$, $Ay_2$, $Ay_3$, and $Ay_4$) may be determined based on the known coordinates of at least four base points in the first part of each of the two images, which would produce a system of eight equations with eight variables. To determine the transformation coefficients $\{Ax_j, Ay_k\}$, the processing device implementing method 100 may randomly select multiple base points in the first image 210 and their corresponding counterparts in the second image 220. In one implementation, the processing device may select four random base points and construct a first model by determining a set of coefficients $\{Ax_j, Ay_k\}$ from the coordinates (x,y) and (X,Y) of these base points in the two images 210 and 220. There may be m=M!/(M−4)!4! different combinations of 4 base point provided that M base points are identified at blocks 140 and 150. The processing device may continue with randomly selecting additional sets of four base points from m available sets and constructing additional models by determining the corresponding coefficients $\{Ax_j, Ay_k\}$ for each of the sets of the selected base points. In some implementations, the processing device may not build all m possible models and may stop constructing further models once one or more reliable best-fit models emerge, as explained below.

The processing device may compare the models by comparing their coefficients $\{Ax_j, Ay_k\}$. For those sets of base points where all four points happen to be inside the same planar region of the document (e.g., all points were randomly chosen within page 1 or all points were randomly chosen within page 2), different models may have coefficients $\{Ax_j, Ay_k\}$ that are not significantly different from each other. Such models may be considered to belong to the same family of models, identifying a projection of essentially the same plane (X,Y) onto the plane (x,y). The criterion for different models to be deemed the same may be, in one implementation, that differences δX and δY between the coordinates predicted by different models do not exceed a certain acceptable pre-determined length, such as the size of one symbol, or half the size of one symbol, or any other pre-determined metric. Symbols that are too small, e.g., punctuation marks, may be ignored. In contrast, those sets of base points where one or two base points belong to one planar region whereas three or two points belong to another planar region (or to multiple different planar regions) may have deviations δX and δY that are greater than the acceptable pre-determined length and. Such models may be deemed to be different models. Models that form no families (e.g., models that are different from all other models) may be discarded, while families having the highest number of models may be identified as best-fit candidates for a verification procedure. In some implementations, any family with at least two models with close coefficients $\{Ax_j, Ay_k\}$ may be identified as a possible best-fit candidate and subjected to the verification procedure.

In one implementation, median coefficients $\{Ax_j, Ay_k\}$ may be calculated for each best-fit candidate family of models. For example the median coefficient $Ax_j$ may be an arithmetic (or geometric) mean of all the corresponding coefficients $Ax_j$ in the same family of models. In other implementations, a randomly chosen (among all models of the family) set of the coefficients $\{Ax_j, Ay_k\}$ may be taken as the median for the family. In yet other implementations, the random sample consensus (RANSAC) model may exclude distant outliers before determining the median.

In some implementations, all base points may be checked against the median coefficients $\{Ax_j, Ay_k\}$ of each family of models. For example, the median coordinate transformation for the first family may be able to convert $(x,y) \rightarrow (X,Y)$ the coordinates of a set of $M_1$ base points with the acceptable accuracy $\delta X$ and $\delta Y$ (e.g., half the size of a typical symbol in the first image or the second image). Based on this, the processing device may determine that the set of $M_1$ base points corresponds to a first planar region of the document (e.g., page 1 of FIG. 1) where the median transformation converting the coordinates (x,y) of the first image to the coordinates (X,Y) of the second image is described by the median coefficients $\{Ax_j, Ay_k\}$ of the first family of models. The processing device may then exclude the identified set of $M_1$ base points from further iterations of the method 100.

The method 100 may continue, at block 170, with the processing device determining a second coordinate transformation that translates coordinates of a second part of the first image 210, e.g., the image of page 2 of the document, into coordinates of the corresponding part of the second image 220. In some implementations, the median coordinate transformation for a second family, determined at block 160, may be able to convert the coordinates of a set of $M_2$ base points—different from any of the $M_1$ points of the first set—with the same accuracy $\delta X$, $\delta Y$. Accordingly, the processing device may determine that the set of $M_2$ base points corresponds to a second planar region of the document (e.g., page 2 of FIG. 1), and that the median coefficients $\{Ax_j, Ay_k\}$ of the second family of models are to be used for the transformation of the coordinates $(x,y) \rightarrow (X,Y)$ of the second planar region of the document. In some implementations, there may be no second family of models with at least two sets of coefficients $\{Ax_j, Ay_k\}$. In such implementations, after the first set of $M_1$ base points has been eliminated from the total number of M base points in the first image (e.g., upon being identified to correspond to the first planar region of the document), the processing device may repeat the operations described above in reference to block 160, but this time with the $M-M_1$ starting base points. Such iterative procedure may be continued until all base points are identified as belonging to some planar region of the document. As a result, all M base points identified at blocks 140 and 150 may be allocated to N planar regions of the document in the first image.

In some implementations, it may not be possible to identify all base points as belonging to some planar region of the document. For example, one or more base points may be located near a fold of the document where the document gradually transitions between two adjacent planar regions (e.g., in case when a document has a crease) or has a sharp fold (e.g., in case of a book having a tight central binding). In such implementations, the processing device may stop further iterations when a pre-determined number of base points—such as 60%, 70%, 80%, and so on—have been allocated to various planar regions. The processing device may then determine the location of the boundary region—a region near an intersection of the two planes containing the first planar region and the second planar region of the document. Such intersection occurs over a line that is referenced in this disclosure as "the boundary line." Depending on the actual topology of the first image, there may be more than one boundary line between various planar regions of the document. The knowledge of the locations of the boundary lines may be used for determining which transformation is to be used for the conversion of coordinates $(x,y) \rightarrow (X,Y)$ of various points (e.g., points other than the base points) in the first image. Additionally, the knowledge of the locations of the boundary lines may be used to improve the accuracy of the transformations in the regions of the first image that are adjacent to the boundary lines.

In some implementations, each of the first and the second image may display a plurality of planar regions of the document. In some implementations, the planar regions imaged in the two documents may be different. For example, the first image may be taken of an open book having two planar regions (pages) whereas in the second image the right page of the book may be bent, and the book may thus have three planar regions captured by the second image. In such implementations, substantially the same process as disclosed above, may be used to determine at most $N_1 \times N_2$ transformations to convert coordinates of $N_1$ planar regions of the first document to the coordinates of $N_2$ planar regions of the second document. The maximum number $N_1 \times N_2$ of possible transformations occurs when each planar region of the first document shares at least some points with each planar region of the second document. For example, this may happen if the folds of the document in the first image are horizontal while the folds of the document in the second image are vertical. In other implementations, the number of required transformations may be significantly smaller. For example, in the above illustration of an open book having a bent right page shown in the second image, there will be only three (rather than $2 \times 3 = 6$) different transformations. Namely, one transformation will map the left (unbent) page in the first image to the left page in the second image, and two transformations will map the right page in the first image to the bent right page in the second image. The minimum number of required transformations is equal to max $(N_1, N_2)$.

To determine the coordinate transformations, the processing device may randomly select sets of four base points, and for each set construct a model (e.g., a set of coefficients $\{Ax_j, Ay_k\}$) converting the coordinates (x,y) of the points of the selected sets in the first image 210 to the coordinates (X,Y) of the corresponding points in the second image 220. The processing device may compare the constructed models and select those models that belong to the same family of models (i.e., have the same coefficients $\{Ax_j, Ay_k\}$ within the acceptable accuracy). In some implementations, any family with at least two models with sufficiently close coefficients $\{Ax_j, Ay_k\}$ may be subjected to the verification procedure. Upon a successful completion of the verification procedure, a first family of models may be identified as mapping a part of a first planar region of the first document to a part of a first planar region of the second document. The base points used to identify this first family of models may then be eliminated from the subsequent iteration analysis of the remaining base points. The iterative procedure may be continued until all base points are identified as belonging to a specific planar region in the first image of the document and a specific planar region in the second image of the document. At the end of this iteration procedure, the total number of identified transformations $N_{tot}$ may be between, max $(N_1, N_2) \leq N_{tot} \leq N_1 \times N_2$.

Figure 3:
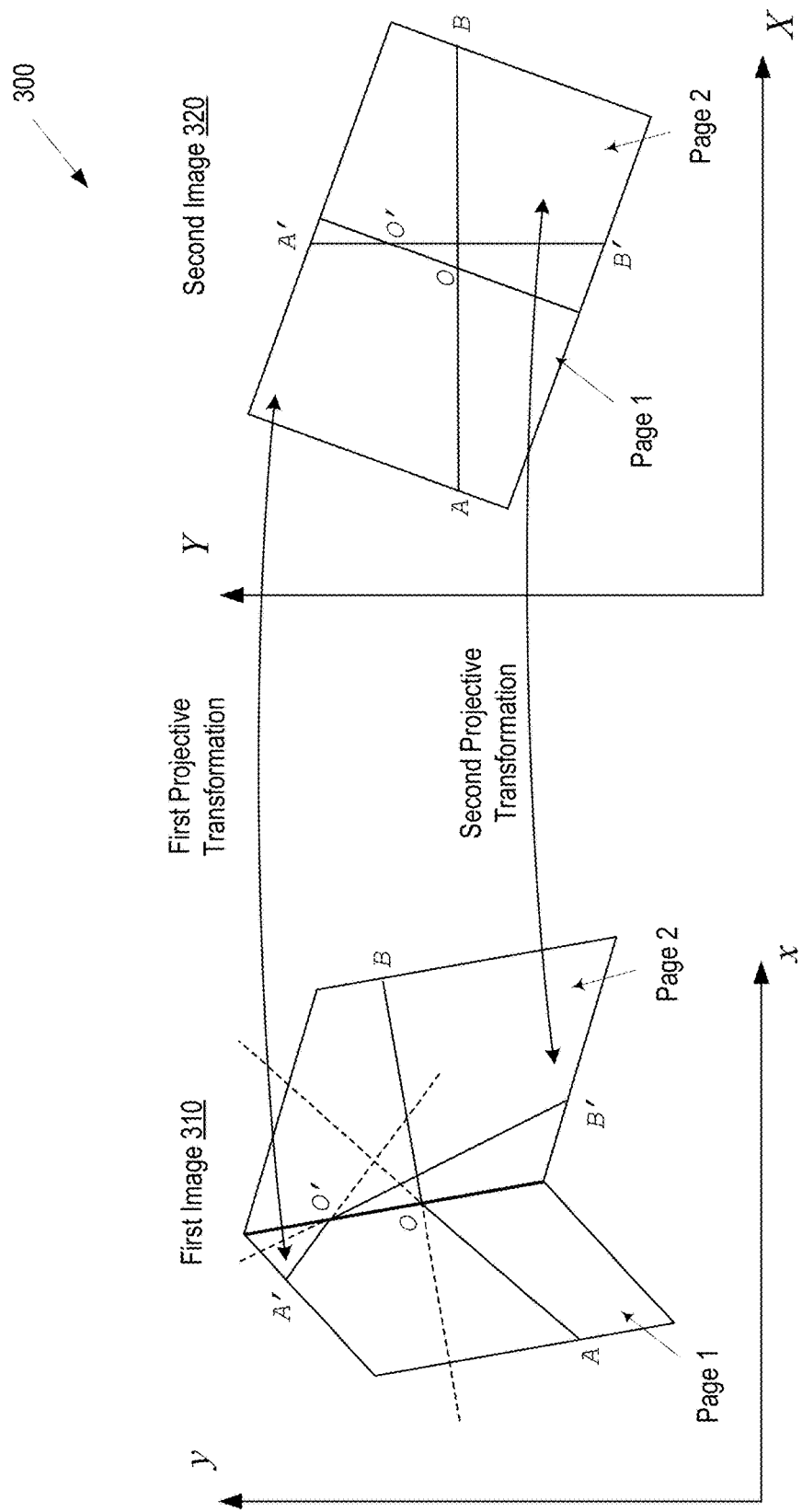
FIG. 3 schematically illustrates an example implementation of a procedure for determining the boundary line between two planar regions of the first image.

FIG. 3 illustrates an example implementation 300 of a procedure for determining the boundary line between two planar regions of the first image, in accordance with one or more aspects of the present disclosure. For clarity and conciseness, the present description assumes a single boundary line between two planar regions. However, substantially the same procedure may be used for any number of planar regions separated by the corresponding number of boundary lines.

Coordinates (x,y) in page 1 (the first planar region) of the document in the first image 310 may be transformed into the coordinates (X,Y) in the second image 320 by the projective transformation (1)-(2) with the coefficients $\{Ax_j, Ay_k\}$ that may be determined as explained above. The coordinates in page 2 (the second planar region) in the first image 310 may be transformed into the corresponding coordinates in the second image 320 by another projective transformation $$X = \frac{Bx_1 * x + Bx_2 * y + Bx_3}{Bx_4 * x + By_4 * y + 1} \quad (3)$$

$$Y = \frac{By_1 * x + By_2 * y + By_3}{Bx_4 * x + By_4 * y + 1} \quad (4)$$

with the coefficients $\{Bx_j, By_k\}$ that may be determined as disclosed above. The processing device may select two perpendicular lines, e.g. a line AB ($Y=Y_0$) and a line A'B' ($X=X_0$). The line AB may intersect the boundary line at a point O whereas line A'B' may intersect the boundary line at a point O'. Performing the first projective transformation of coordinates (1)-(2), the processing device may obtain the line AO and the line A'O' in the first image. Similarly, performing the second projective transformation of coordinates (3)-(4), the processing device may obtain the line OB and the line O'B' in the first image. The points O and O', where the corresponding lines intersect, represent two points belonging to the boundary line OO' in the first image. Transformation of the equation $Y=Y_0$ to the coordinates x and y of the first image according to the first projective transformation (2) and to the second projective transformation (4) yields the following system of linear equations for the coordinates of the point O:

$$(Ay_1 - Y_0 * Ax_4) * x + (Ay_2 - Y_0 * Ay_4) * y = Y_0 - Ay_3 \quad (5)$$

$$(By_1 - Y_0 * Bx_4) * x + (By_2 - Y_0 * By_4) * y = Y_0 - By_3 \quad (6)$$

The solution of the system of equations (5)-(6) may determine the coordinates $(x_O, y_O)$ of the point O. Similarly, transformation of the equation $X=X_0$ to the coordinates x and y of the first image according to the first projective transformation (1) and to the second projective transformation (3) yields the following system of linear equations for the coordinates of the point O':

$$(Ax_1 - X_0 * Ax_4) * x + (Ax_2 - X_0 * Ay_4) * y = X_0 - Ax_3 \quad (7)$$

$$(Bx_1 - X_0 * Bx_4) * x + (Bx_2 - X_0 * By_4) * y = X_0 - Bx_3 \quad (8)$$

The solution of the system of equations (7)-(8) may determine the coordinates $(x_{O'}, y_{O'})$ of the point O'. Based on the determined coordinates of the points O' and O, the boundary line separating the first planar region from the second planar region may be determined by the following equation $$y(x) = y_O + (x - x_O) * \frac{y_{O'} - y_O}{x_O - x_{O'}}$$

In some implementations of the process of determining the boundary line, one of the pair of equations (5)-(6) or (7)-(8) may not have a solution. For example, the second system (7)-(8) will not have a solution if the line $X=X_0$ is parallel to the boundary line. In such instances, the first system of equations (5)-(6) will necessarily have a solution, because the line $Y=Y_0$ will be perpendicular to the boundary line. Once the processing device determines that the system (7)-(8) lacks a solution for some value $x_0$, the processing device may determine the parameters of the boundary line from the system (5)-(6) alone, by selecting a different value $Y_{0'}$, to obtain another system of equations for the coordinates of a point where the line $Y=Y_{0'}$ intersects the boundary line.

Figure 4:
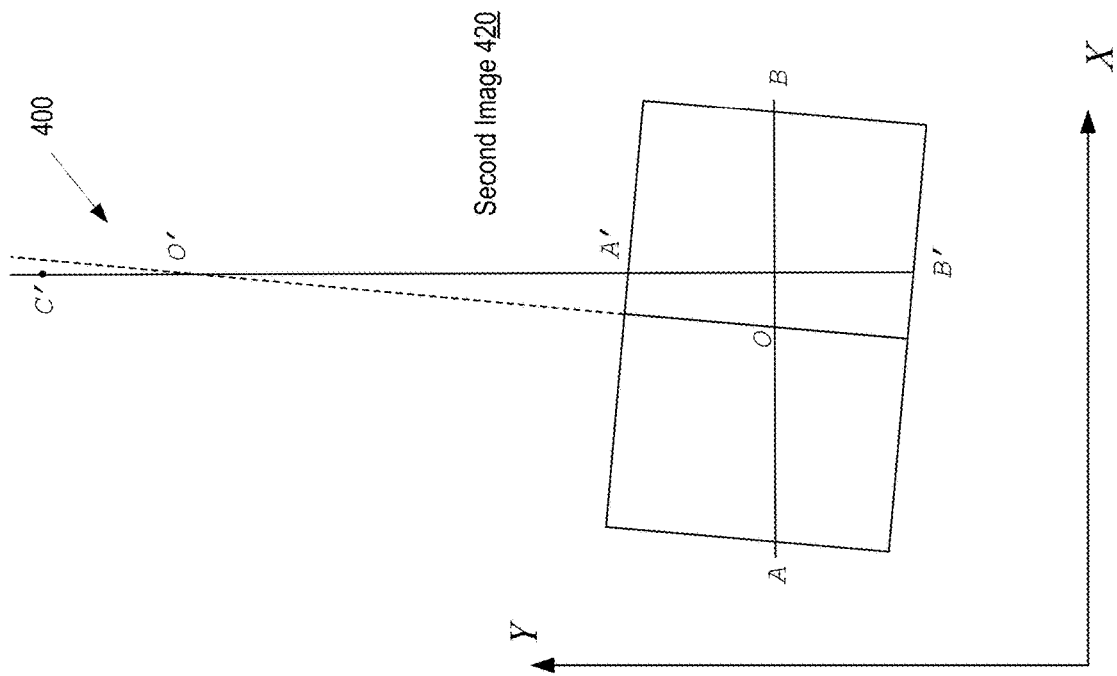
FIG. 4 schematically illustrates an example implementation of a procedure for determining the boundary line between two planar regions of the first image, where a line chosen for determination of a boundary line happens to be almost parallel to the boundary line.
Figure 4:
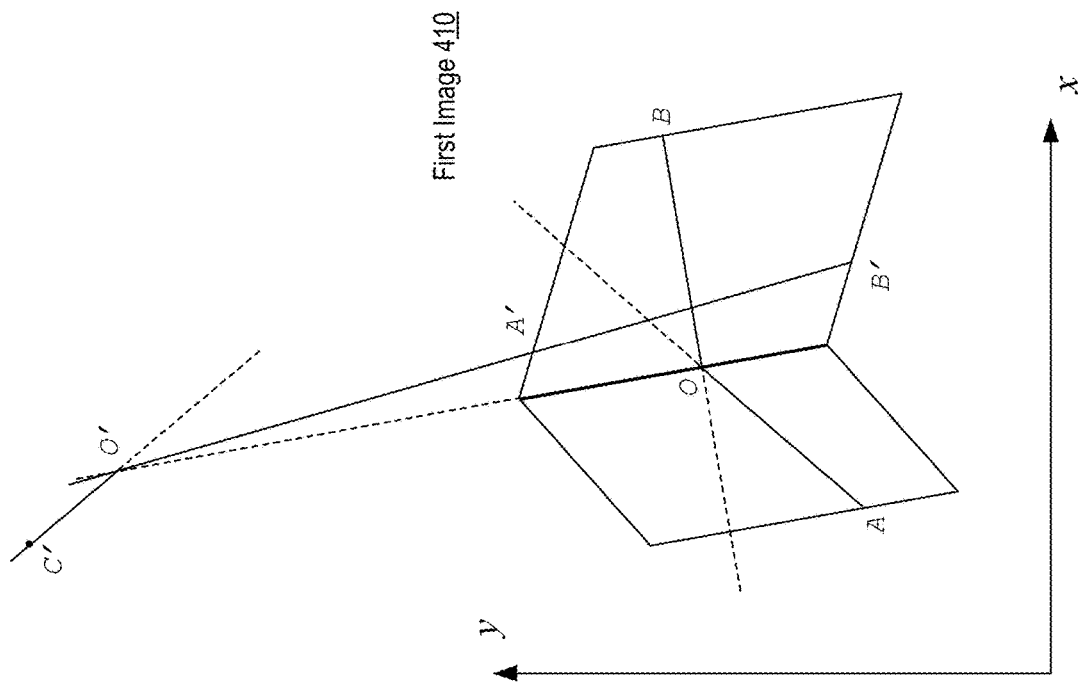

In some implementations, one of the selected lines, e.g., the line $X=X_0$, may not be exactly parallel to the boundary line and may make a non-zero but small angle with the boundary line, as schematically shown in FIG. 4, which illustrates an example implementation 400 of a procedure for determining the boundary line between two planar regions of the first image, where a line chosen for determination of a boundary line happens to be almost parallel to the boundary line.

In such implementations, the crossing point O' may exist, but lie outside the contours of the document, as shown in the depiction of the second image 420. If the point O' found from the system of equations (7)-(8) lies too far outside the contours of the document, such point O' may be discarded and not used for determination of the parameters of the boundary line. For example, the processing device may discard those points O' that are separated from all base points by a distance that is more than the maximum distance between any two base points, a half that distance, twice that distance, or any other pre-determined criteria. In such implementations, the processing device may treat the lines $X=X_0$ as being essentially parallel to the boundary line and resort to determining the parameters of the boundary line from two (or more) equations obtained from the lines $Y=Y_0$, as explained above. In some implementations, it may be that the lines $Y=Y_0$ that are parallel or almost parallel to the boundary, in which case the determination of the parameters of the boundary lines may be determined from the lines $X=X_0$ instead.

In some implementations, the boundary line may be determined from more than two pairs of equations (either the pairs (5)-(6) or the pairs (7)-(8), or any combination thereof). In this case, the system for the parameters of the boundary line may be an over-determined system. Such an over-determined system may be used to determine the parameters of the boundary line from regression analysis methods, such as the method of least squares.

The transformation coefficients for the first transformation (1)-(2) and the transformation coefficients for the second transformation (3)-(4) may be applied to the coordinates of an arbitrary chosen point in the first image, in order to determine the coordinates of the corresponding point in the second image. The determined parameters of the boundary line may be used to indicate whether the chosen point (x,y) corresponds to a first planar region or the second planar region of the document. Accordingly, the first coordinate transformation may be used for transformation of the coordinates of points of the first image that are on one side of the boundary line while the second coordinate transformation may be used for transformation of the coordinates of points of the first image that are on other side of the boundary line.

For example, for a given point (x,y) the following number may be calculated $$C = (x - x_{O'}) * (y_{O'} - y_O) + (y - y_{O'}) * (x_O - x_{O'})$$

For those points that lie on one side of the boundary line, C<0; for the points on the opposite side of the boundary line, C>0; and for the points that belong to the boundary line, C=0.

Figure 5B:
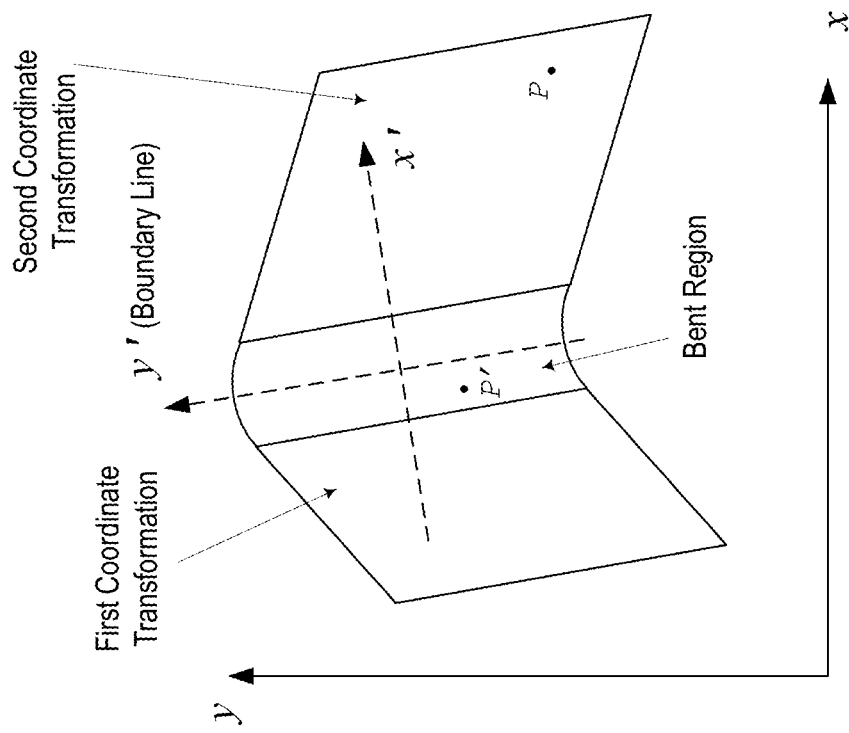
FIG. 5B schematically illustrates an image of an example continuously bent document of FIG. 5A having two planar regions connected by a smooth transition region.
Figure 5A:
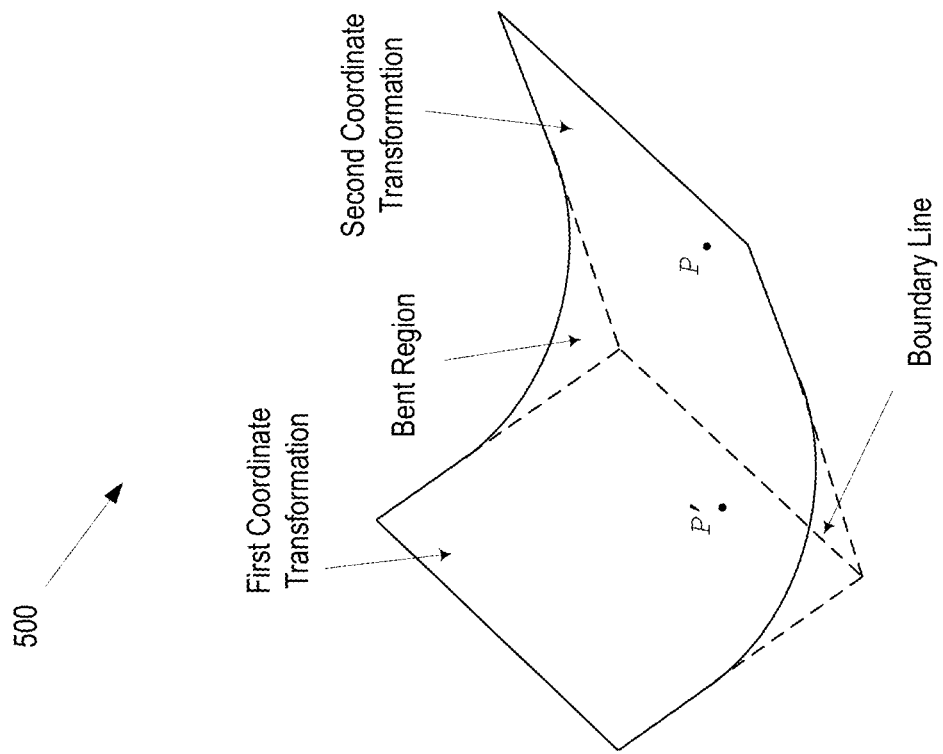
FIG. 5A schematically illustrates a three-dimensional depiction of an example continuously bent document having two planar regions connected by a smooth transition region.

In some implementations, as illustrated for example in FIG. 5A, the boundary line—determined as described above as an intersection of planes containing adjacent planar regions of the document—may not correspond to a sharp fold of the document. FIG. 5A schematically illustrates a three-dimensional depiction of an example continuously bent document having two planar regions connected by a smooth transition region. As illustrated by FIG. 5A, in the three-dimensional space, such intersection may even be located outside a two-dimensional surface that contains the document. The bent region of the document, e.g., the area near the fold may extend over some distance and blend smoothly into the planar regions on both sides of the boundary line, as illustrated in FIG. 5A. In such instances, the boundary line may still serve as a useful reference—as some central line of the bent region.

When the image of the document is taken, the angle and location of the camera may be such that inside the bent region, the coordinates (x,y) in the image may not exactly correspond to the actual locations of the document when those locations are inside the bent region. This may be true regardless of whether the first coordinate transformation or the second coordinate transformation is used, as neither of the two transformations may be accurate (e.g., to the accuracy of half the size of a typical symbol in the document) inside the bent region. For example, for a point P located well inside the second planar region, the second transformation may be accurate, but for a point P' located within the bent region, neither the second nor the first coordinate transformations may provide sufficient accuracy.

To improve the accuracy of the transformation of various points (and thus symbols and symbol sequences) of the first image into points of the second (and/or additional images), the projective transformations (1)-(2) and/or (3)-(4) established for the regions adjacent to the boundary line may be improved with heuristic boundary corrections ΔX(x,y), ΔY(x,y). In some implementations, the corrections ΔX(x,y), ΔY(x,y) may account for the deviation of the actual document from the two (or more) planes on which the projective transformations work (up to the errors that may be inherent in the process of identification of the base points used in determination of the parameters of the two transformations). In some implementations, the corrections ΔX(x,y), ΔY(x,y) may depend on the extent (e.g., smoothness) of the bent region, the degree to which the document departs from a sharp fold, the non-uniformity of the deformation of the document along the direction of the fold, and so on.

FIG. 5B schematically illustrates an image of an example continuously bent document of FIG. 5A having two planar regions connected by a smooth transition region. In some implementations, the boundary corrections ΔX(x',y'), ΔY(x', y') may be referenced in terms of the local coordinates x' and y' associated with the boundary line. For example, one of the local axes, such as the axis y', may be selected to coincide with the boundary line, as shown in FIG. 5B. The other axis x' may be chosen to be perpendicular to y' with the origin of the local coordinate system selected randomly, in some implementations, or using some regression analysis method (e.g., the least squares method), as a point that is the least remote (or all points on the boundary line) to all base points identified at blocks 140 and 150. The transformation from the coordinates x and y to the local coordinates x' and y' may be a combination of a translation and a rotation to an angle that the new axis y' makes with the old axis y.

In some implementations, the boundary correction in the local coordinates x' and y' may be approximated by the following equations:

$$\Delta X = \frac{A_X + B_X * y'}{1 + C_X * |x'|}, \Delta Y = \frac{A_Y + B_Y * y'}{1 + C_Y * |x'|}$$

which define corrections that decrease with the distance from the boundary line x'=0. The coefficients $A_X$ and $A_Y$ describe some average values of the boundary corrections right on the boundary line. The coefficients $B_X$ and $B_Y$ describe the non-uniformity of these corrections along the boundary line. More specifically, non-zero values of the coefficients $B_X$ and $B_Y$ may be invoked in situations where the document has a fold that is sharper near one end of the boundary line and more spread out near the opposite end of the boundary line. For example, positive coefficients $B_X$>0 and $B_Y$>0 may indicate that fold is sharper near the lower end (y'<0) of the boundary line and wider near its upper end (y'>0). The coefficients $C_X$ and $C_Y$ describe a lateral sharpness of the fold. For example, smaller values of these coefficients may indicate the bent region that extends over a wide area of the document whereas larger values of these coefficients may indicate that the bent region extends over a narrow area.

The corrections ΔX(x',y'), ΔY(x',y') may be added to one or more of the first coordinate transformation or the second coordinate transformation, or both. For example, when converting the coordinates (x,y) of the first image into the coordinates of the second image (X,Y), the processing device may begin by determining the relation of the coordinates (x,y) to the boundary line and selecting the appropriate (first or second) projective coordinate transformation, depending on the determined relation. The processing device may then, optionally, add the corrections ΔX and ΔY to the coordinates determined from the appropriate projective coordinate transformation. In some implementations, the same corrections may be added regardless of whether it is determined that the first coordinate transformation or the second coordinate transformation has been selected. In some implementations, only one of the corrections ΔX(x',y'), ΔY(x',y') may be used whereas the other correction may not be added.

The coefficients in the corrections ΔX(x',y'), ΔY(x',y') may be determined from the coordinates of a plurality of base points located within the bent region near the fold, in some implementations. For example, the three pairs of coefficients $(A_X,A_Y)$, $(B_X,B_Y)$, $(C_X,C_Y)$ may be determined from the coordinates of three base points located within the bent region. To assure accuracy, only base points that are sufficiently close to the boundary line may be used for this purpose. For example, in some implementations, only base points whose coordinates deviate from the coordinates predicted by the two transformations by at least some predetermined value may be used for determining the coefficients $(A_X,A_Y)$, $(B_X,B_Y)$, $(C_X,C_Y)$. The predetermined value may be related to the size of a typical symbol (e.g., the most frequently occurring symbol size, the average symbol size, etc.) in the document (image). A typical symbol may be a letter, in one example. In some implementations, the predetermined value may be equal to a height (width) of such typical symbol or twice its height (width), half its height (width), or any other value. In some implementations, only those base points that are located within a predetermined distance from the boundary line may be used for determining the coefficients $(A_X, A_Y)$, $(B_X, B_Y)$, $(C_X, C_Y)$. For example, the predetermined distance may be equal to ten (or any other integer or fractional number of) heights (widths) of the typical symbol in the document. In some implementations, the maximum distance to the boundary line may be a certain fraction of the size (width, length) of an image of the document or one of the parts of an image that correspond to one of the planar regions of the document. In some implementations, the boundary correction may be computed with N coefficients rather than six coefficients (as in the case above). In such implementations, N/2 base points may be selected to determine N coefficients. In some implementations, more than three points (or more than N/2 points, in cases where different formulas are used to determine corrections) may happen to be within the boundary region. In such instances a system of equations for the six (or N) parameters may be over-determined. The parameters may then be computed from such an over-determined system using regression analysis methods, e.g., the method of least squares, in one possible implementation.

Upon determining the parameters of the first and second coordinate transformations, the parameters of the boundary line, and (optionally) the boundary corrections, the processing device executing method 100 may proceed with the OCR of the text of the document as follows, in one exemplary implementation.

Referring again to FIG. 1, at block 180, the processing device may identify a symbol sequence of the OCR text in the first image. The processing device may identify matching symbol sequences in the texts produced by optical character recognition in one or a series of additional images of the document that are different from the first image of the document. In some implementations, the second image, used for determining the topology of the first image (e.g., the plurality of the planar regions displayed in the first image and one or more boundary lines separating the planar regions), may be a part of the series of images. In other implementations, the second image may not be included in the series of images for OCR of the text of the document.

The processing device may associate a point (x,y) in the first image with a symbol sequence (e.g., the lower left corner of the bounding box for the symbol sequence). The processing device may ascertain the quantity C and determine its sign. Based on the sign of C, the processing device may employ one of the above-referenced coordinate transformations (1)-(2) or (3)-(4) (with or without the boundary corrections added) to compare positions of various recognized symbol sequences in the second image and all additional images, as pertinent, and thus identify groups of symbol sequences that are likely to represent the same fragment of the original document. For example, the additional images may include a third image, a fourth image, and so on. The groups of symbols in the third image may be identified using a transformation from the coordinates of the second image to the coordinates of the third image (after a plurality of transformations from the first image to the second image have been determined), in some implementations. In other implementations, the coordinates of the third (or any subsequent) image may be determined directly from the coordinates of the first image by using the same techniques and methods disclosed above in relation to the transformations to the second image.

In an illustrative example, for an arbitrary chosen symbol sequence in a text produced by the optical character recognition of a given image, the method may identify one or more matching symbol sequences produced by the optical character recognition of other images of the series of images. Notably, "matching symbol sequences" herein refers to both strictly matching and fuzzily matching symbol sequences.

Figure 6:
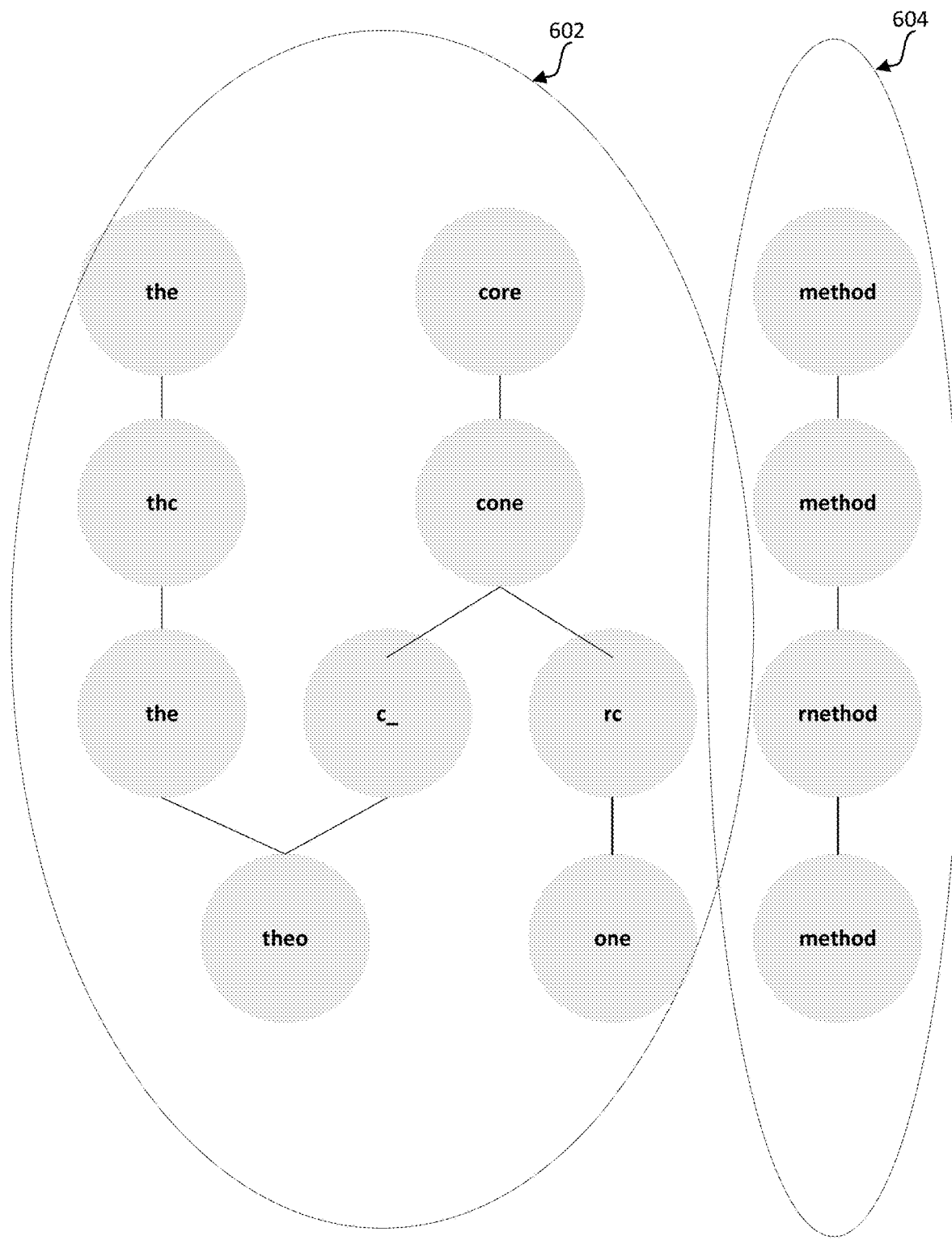
FIG. 6 schematically illustrates an example graph comprising a plurality of clusters of vertices, such that each cluster represents two or more matching symbol sequences, in accordance with one or more aspects of the present disclosure.

In certain implementations, the computer system may produce a graph, the vertices of which would represent symbol sequences from the plurality of images, and edges would interconnect the symbol sequences that were identified as being matching (i.e., representing the same fragment of the original text) by applying the above-mentioned coordinate transformations. As schematically illustrated by FIG. 6, the resulting graph would comprise a plurality of clusters of vertices, such that each cluster represents two or more matching symbol sequences. The vertices within each cluster are interconnected by respective edges, while individual clusters may be isolated or weakly connected to each other. FIG. 6 shows two clusters (602, 604) representing OCR produced symbol sequences for two original strings: "the core" and "method."

Figure 7A:
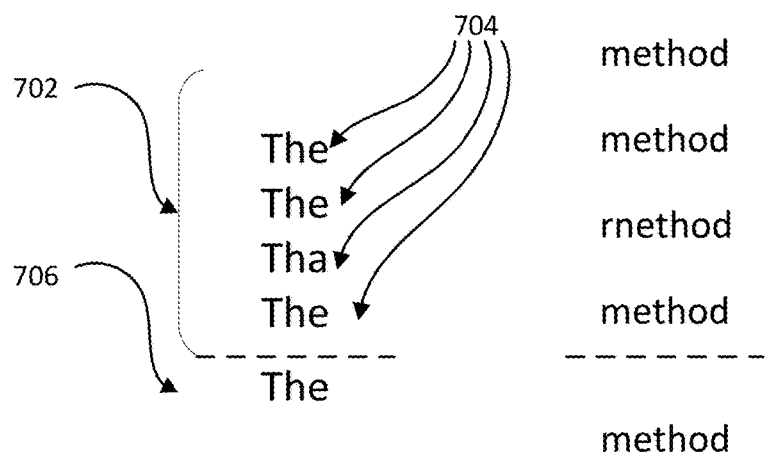
FIG. 7A schematically illustrates identifying the median string among a plurality of symbol sequences representing the OCR results of the corresponding image fragments, in accordance with one or more aspects of the present disclosure.

At block 190, the processing device may identify the median string of each cluster of matching symbol sequences, such that the identified median string would represent the OCR result of the associated image fragment. As schematically illustrated by FIG. 7A, each cluster 702 may comprise a plurality of matching symbol sequences 704, and the OCR result of the associated image fragment may be represented by the median string 706. In certain implementations, the median string may be identified as the symbol sequence having the minimal sum of edit distances to all symbol sequences of the cluster. The edit distance, which may in an illustrative example be represented by the Levenshtein distance, between a first symbol sequence and a second symbol sequence may be equal to the minimum number of single-symbol edits (i.e. insertions, deletions or substitutions) required to transform the first symbol sequence into the second symbol sequence.

Figure 7B:
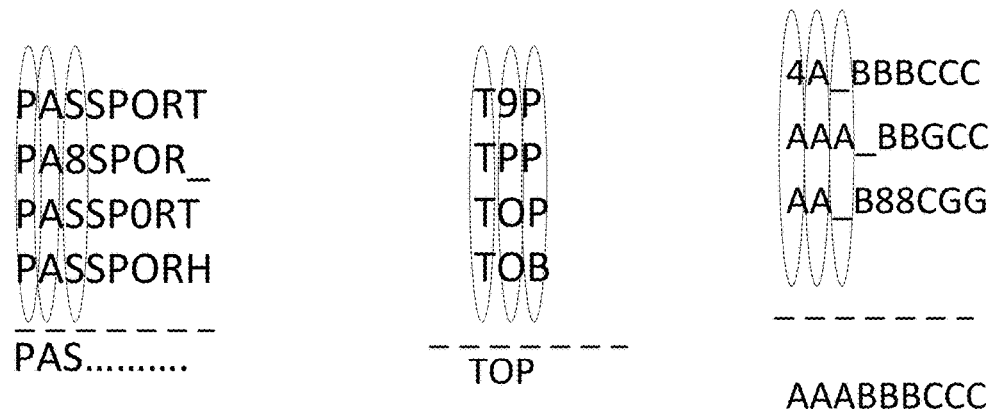
FIG. 7B schematically illustrates identifying the median string among a plurality of symbol sequences representing the OCR results of the corresponding image fragments, in accordance with one or more aspects of the present disclosure.
Figure 7C:
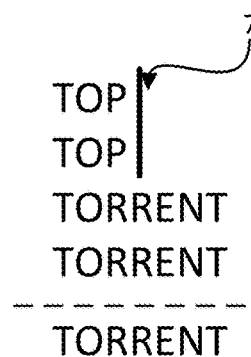
FIG. 7C schematically illustrates identifying the median string among a plurality of symbol sequences representing the OCR results of the corresponding image fragments, in accordance with one or more aspects of the present disclosure.

In certain implementations, the computational complexity of identifying the median string may be reduced by applying certain heuristics methods. In an illustrative example, the computer system may heuristically identify the zeroth-order approximation of the median string. The computer system may then align the symbol sequences using strictly matching symbols within each sequence, as schematically illustrated by FIG. 7B. In another illustrative example, the computer system may associate, with each symbol sequence of the cluster, a weight coefficient reflecting the position of the symbol sequence within the image or the OCR confidence metric. As schematically illustrated by FIG. 7C, a cluster 712 comprises four symbol sequences TOP, TOP, TORRENT, TORRENT. The first two symbol sequences represent partial words, since the distance from an edge of the minimum bounding rectangle of the symbol sequence to the edge of the image is less than the whitespace width. Therefore, the OCR confidence metric value for the first two symbol sequences is significantly less than the OCR confidence metric value for the remaining two symbol sequences, and hence the symbol sequence TORRENT would be chosen as the median string by the method that takes into account the OCR confidence values.

The processing device executing method 100 may identify the order, in which the symbol sequences representing the above-mentioned clusters should appear in the resulting text. As noted herein above, the images representing the original document may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters. Therefore, the texts produced by the OCR of each individual image may differ by one or more words being present or absent in each OCR result, by variations in the symbol sequences representing the words of the original text, and/or by the order of the symbol sequences.

In certain implementations, the computer system may compare a plurality of permutations of the symbol sequences that represent the identified clusters. The median permutation may be identified as the permutation having the minimal sum of Kendall tau distances to all other permutations. The Kendall tau distance between a first permutation and a second permutation may be equal to the minimum number of swapping operations required by the bubble sort algorithm to transform the first permutation into the second symbol permutation.

Referring again to FIG. 1, at block 195, the computer system may utilize the ordering the symbol sequences representing the above-mentioned clusters, in order to produce the resulting text representing the original document.

As noted herein above, the text produced by the OCR systems and methods described herein may be further processed, e.g., by machine translation methods for translating the original text into another natural language. Since the methods described herein allow reconstructing the original text, and not only individual words, the machine translation methods may employ syntactic and/or semantic analyses of the original text in order to improve the translation quality.

Figure 8:
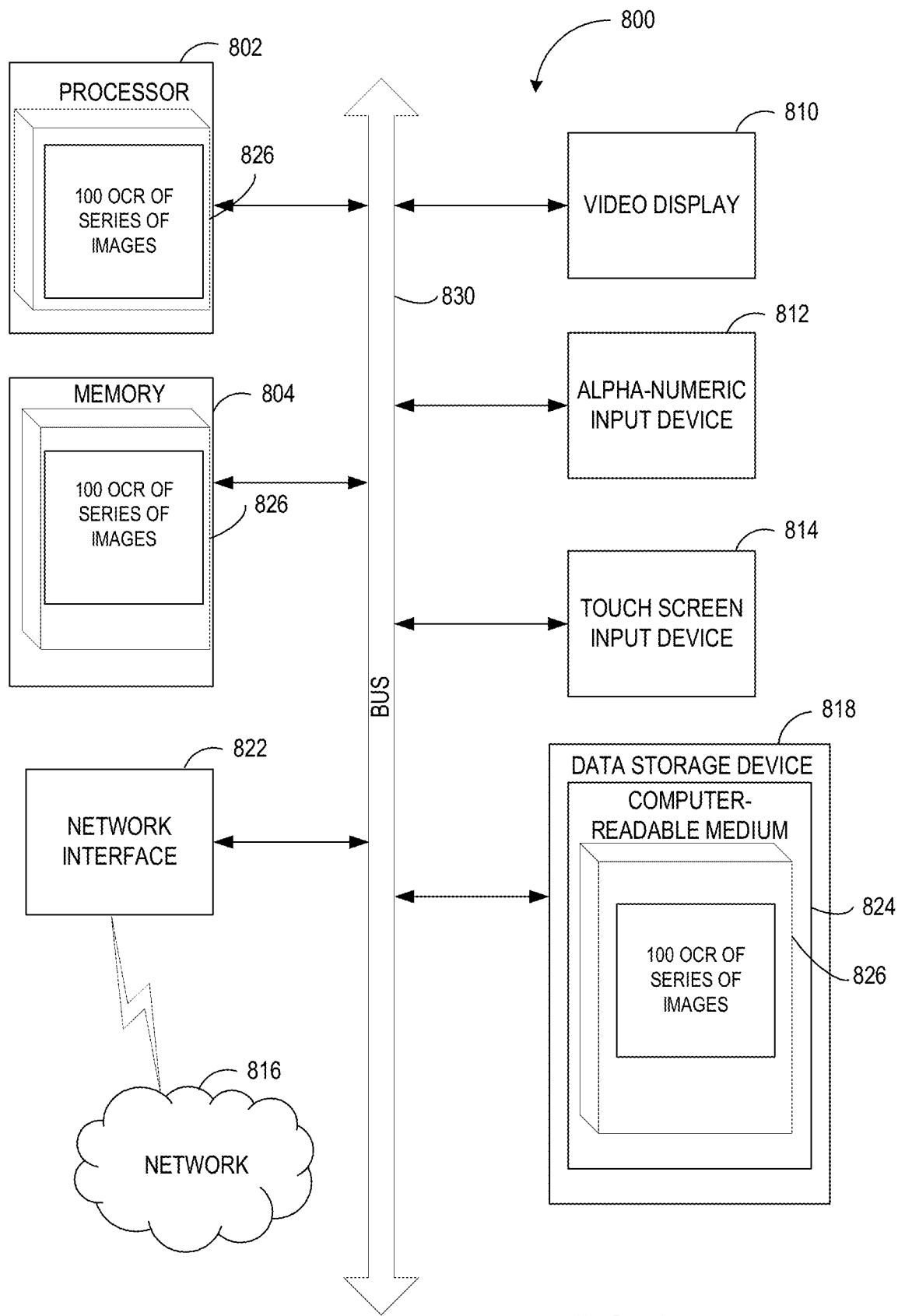
FIG. 8 depicts a diagram of an illustrative example of a computer system implementing the methods described herein.

FIG. 8 depicts a component diagram of an example computer system 800 within which a set of instructions, for causing the computer system to perform any one or more of the methods discussed herein, may be executed. The computer system 800 may be connected to other computer system in a LAN, an intranet, an extranet, or the Internet. The computer system 800 may operate in the capacity of a server or a client computer system in client-server network environment, or as a peer computer system in a peer-to-peer (or distributed) network environment. The computer system 800 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 800 includes a processor 802, a main memory 804 (e.g., read-only memory (ROM) or dynamic random access memory (DRAM)), and a data storage device 818, which communicate with each other via a bus 830.

Processor 802 may be represented by one or more general-purpose processing devices such as a microprocessor, central processing unit, or the like. More particularly, processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute instructions 826 for performing the operations and functions of method 100 for performing OCR of a series of images comprising text symbols, as described herein above.

Computer system 800 may further include a network interface device 822, a video display unit 810, a character input device 812 (e.g., a keyboard), and a touch screen input device 814.

Data storage device 818 may include a computer-readable storage medium 824 on which is stored one or more sets of instructions 826 embodying any one or more of the methods or functions described herein. Instructions 826 may also reside, completely or at least partially, within main memory 804 and/or within processor 802 during execution thereof by computer system 800, main memory 804 and processor 802 also constituting computer-readable storage media. Instructions 826 may further be transmitted or received over network 816 via network interface device 822.

In certain implementations, instructions 826 may include instructions of method 100 for performing OCR of a series of images comprising text symbols, as described herein above. While computer-readable storage medium 824 is shown in the example of FIG. 8 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   obtaining, by a processing device, a first image comprising a first part depicting a first region of a document and a second part depicting a second region of the document, wherein the first region of the document and the second region of the document, as depicted in the first image, are mutually non-coplanar;
   obtaining, by the processing device, a second image of the document;
   identifying, by the processing device and using a first set of reference points of the document, a first transformation associating the first part of the first image with a first part of the second image, wherein the first part of the second image depicts the first region of the document;
   identifying, by the processing device and using a second set of reference points of the document, a second transformation associating the second part of the first image with a second part of the second image, wherein the second part of the second image depicts the second region of the document;
   identifying, by the processing device and using the first transformation and the second transformation, a first symbol sequence depicted in the first image and a corresponding second symbol sequence depicted in the second image; and
   performing optical character recognition (OCR) of a text in the document using the first symbol sequence and the second symbol sequence.

2. The method of claim 1, wherein each of the first set of reference points of the document is associated with at least one textual artifact of a plurality of textual artifacts in both the first image and the second image, wherein each textual artifact is represented by a sequence of symbols having a frequency of occurrence not exceeding a threshold frequency.

3. The method of claim 1, further comprising:
   identifying, based on the first transformation and the second transformation, a boundary line that corresponds to a boundary between the first region of the document and the second region of the document.

4. The method of claim 3, wherein at least one of the first transformation or the second transformation comprises a boundary correction characterizing a degree to which the document, as depicted in the first image, is bent in a region associated with the boundary line.

5. The method of claim 1, wherein the first transformation and the second transformation are projective transformations.

6. The method of claim 1, wherein performing the OCR of the text in the document comprises:
   identifying, using the first transformation and the second transformation, a cluster of symbol sequences comprising the first symbol sequence and the second symbol sequence; and
   determining a median symbol sequence for the cluster of symbol sequences.

7. The method of claim 6, wherein the median symbol sequence for the cluster of symbol sequences is determined by applying a predetermined metric to the cluster of symbol sequences.

8. The method of claim 7, wherein determining the median symbol sequence comprises applying weight coefficients to each symbol sequence of the cluster of symbol sequences.

9. A system comprising:
   a memory that stores instructions; and
   a processing device, communicatively coupled to the memory, to execute the instructions to:
      obtain a first image comprising a first part depicting a first region of a document and a second part depicting a second region of the document, wherein the first region of the document and the second region of the document, as depicted in the first image, are mutually non-coplanar;
      obtain a second image of the document;
      identify, using a first set of reference points of the document, a first transformation associating the first part of the first image with a first part of the second image, wherein the first part of the second image depicts the first region of the document;
      identify, using a second set of reference points of the document, a second transformation associating the second part of the first image with a second part of the second image, wherein the second part of the second image depicts the second region of the document;
      identify, using the first transformation and the second transformation, a first symbol sequence depicted in the first image and a corresponding second symbol sequence depicted in the second image; and perform optical character recognition (OCR) of a text in the document using the first symbol sequence and the second symbol sequence.

10. The system of claim 9, wherein each of the first set of reference points of the document is associated with at least one textual artifact of a plurality of textual artifacts in both the first image and the second image, wherein each textual artifact is represented by a sequence of symbols having a frequency of occurrence not exceeding a threshold frequency.

11. The system of claim 9, wherein the processing device is further to identify, based on the first transformation and the second transformation, a boundary line that corresponds to a boundary between the first region of the document and the second region of the document.

12. The system of claim 11, wherein at least one of the first transformation or the second transformation comprises a boundary correction characterizing a degree to which the document, as depicted in the first image, is bent in a region associated with the boundary line.

13. The system of claim 11, wherein to perform the OCR the processing device is further to:

identify, using the first transformation and the second transformation, a cluster of symbol sequences comprising the first symbol sequence and the second symbol sequence; and determine a median symbol sequence for the cluster of symbol sequences.

14. The system of claim 13, wherein to determine the median symbol sequence for the cluster of symbol sequences, the processing device is to apply at least one of i) a predetermined metric to the cluster of symbol sequences or ii) weight coefficients to each symbol sequence of the cluster of symbol sequences.

15. A non-transitory computer-readable medium having instructions stored thereon that, when executed by a processing device, cause the processing device to perform operations comprising:

obtaining a first image comprising a first part depicting a first region of a document and a second part depicting a second region of the document, wherein the first region of the document and the second region of the document, as depicted in the first document, are mutually non-coplanar;

obtaining a second image of the document;

identifying, using a first set of reference points of the document, a first transformation associating the first part of the first image with a first part of the second image, wherein the first part of the second image depicts the first region of the document;

identifying, using a second set of reference points of the document, a second transformation associating the second part of the first image with a second part of the second image, wherein the second part of the second image depicts the second region of the document;

identifying, using the first transformation and the second transformation, a first symbol sequence depicted in the first image and a corresponding second symbol sequence depicted in the second image; and performing optical character recognition (OCR) of a text in the document using the first symbol sequence and the second symbol sequence.

16. The non-transitory computer-readable medium of claim 15, wherein each of the first set of reference points of the document is associated with at least one textual artifact of a plurality of textual artifacts in both the first image and the second image, wherein each textual artifact is represented by a sequence of symbols having a frequency of occurrence not exceeding a threshold frequency.

17. The non-transitory computer-readable medium of claim 15, the operations further comprising:

identifying, based on the first transformation and the second transformation, a boundary line that corresponds to a boundary between the first region of the document and the second region of the document.

18. The non-transitory computer-readable medium of claim 17, wherein at least one of the first transformation or the second transformation comprises a boundary correction characterizing a degree to which the document, as depicted in the first image, is bent in a region associated with the boundary line.

19. The non-transitory computer-readable medium of claim 17, the operations further comprising:

identifying, using the first transformation and the second transformation, a cluster of symbol sequences comprising the first symbol sequence and the second symbol sequence; and determining a median symbol sequence for the cluster of symbol sequences.

20. The non-transitory computer-readable medium of claim 19, wherein the operations determining the median symbol sequence for the cluster of symbol sequences comprise:

applying at least one of i) a predetermined metric to the cluster of symbol sequences or ii) weight coefficients to each symbol sequence of the cluster of symbol sequences.

* * * * *